(12) United States Patent
Hansson et al.

(10) Patent No.: US 10,320,506 B2
(45) Date of Patent: **\*Jun. 11, 2019**

(54) SYSTEM FOR ESTABLISHING AND MAINTAINING A CLOCK REFERENCE INDICATING ONE-WAY LATENCY IN A DATA NETWORK

(71) Applicant: Accedian Networks Inc., St-Laurent (CA)

(72) Inventors: Kjell Hansson, Rimbo (SE); Olof Hagsand, Alta (SE)

(73) Assignee: Accedian Networks Inc., St-Laurent, Quebec ( * ) Notice: Subject to any disclaimer, the term of this patent is extended or adjusted under 35 U.S.C. 154(b) by 0 days.

This patent is subject to a terminal disclaimer.

(21) Appl. No.: 15/632,915

(22) Filed: Jun. 26, 2017

(65) Prior Publication Data
US 2017/0294979 A1    Oct. 12, 2017

Related U.S. Application Data

(63) Continuation of application No. 15/213,517, filed on Jul. 19, 2016, now Pat. No. 9,722,718, which is a
(Continued)

(51) Int. Cl.
*H04J 3/06* (2006.01)
*H04L 12/26* (2006.01)
(Continued)

(52) U.S. Cl.
CPC .......... *H04J 3/0658* (2013.01); *H04J 3/0667* (2013.01); *H04L 1/0018* (2013.01);
(Continued)

(58) Field of Classification Search
CPC .......... H04J 3/0658; H04J 3/0667; H04J 3/06; H04L 29/06; H04L 43/50
See application file for complete search history.

(56) References Cited

U.S. PATENT DOCUMENTS 6,545,979 B1    4/2003    Poulin
6,715,087 B1    3/2004    Vergnaud et al.
(Continued)

FOREIGN PATENT DOCUMENTS

| EP | 1215559 | 6/2002 |
|---|---|---|
| WO | WO 2006/033611 | 3/2006 |
| WO | WO 2014/006484 | 1/2014 |

OTHER PUBLICATIONS

De Vito, L. et al. "One-Way Delay Measurement: State of the Art." IEEE Transactions on Instrumentation and Measurement. vol. 57, No. 12, Dec. 2008, pp. 2742-2750 (9 pages).
(Continued)

*Primary Examiner* — Chi Ho A Lee
(74) *Attorney, Agent, or Firm* — Stratford Managers Corporation

(57) ABSTRACT

A method for indicating one-way latency in a data network, with continuous clock synchronization, between first and second node having clocks that are not synchronized with each other includes a continuous synchronization session and a measurement session. The method repetitively sends predetermined synchronization messages from the first node to the second node and from the second node to the first node, calculates a round trip time for each message at the first node, updates a synchronization point if the calculated round trip time is smaller than a previously calculated round trip time, stores the updated synchronization points of a synchronization window, and calculates a virtual clock from the updated synchronization points of the synchronization window. The measurement session collects multiple measurements of one-way latency between the first and second nodes using the virtual clock, and generates a latency profile by interpolating the multiple measurements.

5 Claims, 12 Drawing Sheets

Related U.S. Application Data continuation of application No. 14/817,398, filed on Aug. 4, 2015, now Pat. No. 9,419,780, which is a continuation of application No. 14/305,244, filed on Jun. 16, 2014, now Pat. No. 9,130,703, which is a continuation of application No. 13/593,888, filed on Aug. 24, 2012, now Pat. No. 8,792,380.

(51) Int. Cl.
*H04L 7/00* (2006.01)
*H04L 1/00* (2006.01)
*H04L 29/06* (2006.01)

(52) U.S. Cl.
CPC ........ *H04L 7/0012* (2013.01); *H04L 43/0858* (2013.01); *H04L 43/0864* (2013.01); *H04L 69/22* (2013.01)

(56) References Cited

U.S. PATENT DOCUMENTS

| | | |
|---|---|---|
| 6,868,094 B1 | 3/2005 | Bordonaro et al. |
| 7,113,485 B2 | 9/2006 | Bruckman |
| 7,114,091 B2 | 9/2006 | Vrancic |
| 7,283,568 B2 | 10/2007 | Robie, Jr. et al. |
| 7,286,482 B2 | 10/2007 | Charcranoon |
| 7,519,006 B1 | 4/2009 | Wing |
| 7,710,905 B2 | 5/2010 | Dyck et al. |
| 7,787,483 B2 | 8/2010 | Vanderhaegen et al. |
| 7,936,700 B2 | 5/2011 | Yamazaki et al. |
| 8,121,111 B2 | 2/2012 | Freiberger |
| 8,218,576 B2 | 7/2012 | Hansson et al. |
| 2001/0000071 A1 | 3/2001 | Nichols |
| 2003/0048754 A1 | 3/2003 | Bruckman |
| 2003/0048811 A1 | 3/2003 | Robie et al. |
| 2003/0091029 A1 | 5/2003 | Jo et al. |
| 2003/0093513 A1 | 5/2003 | Hicks et al. |
| 2003/0115321 A1 | 6/2003 | Edmison et al. |
| 2003/0219025 A1 | 11/2003 | Choi et al. |
| 2004/0105391 A1 | 6/2004 | Charcranoon |
| 2005/0148314 A1 | 7/2005 | Taglienti et al. |
| 2007/0268850 A1 | 11/2007 | Hansson |
| 2007/0274227 A1 | 11/2007 | Rauscher et al. |
| 2008/0005354 A1 | 1/2008 | Kryskow, Jr. et al. |
| 2009/0161569 A1 | 6/2009 | Corlett |
| 2009/0190482 A1 | 7/2009 | Blair |
| 2010/0195517 A1 | 8/2010 | Kihara |
| 2010/0283682 A1 | 11/2010 | Heidari-Bateni |
| 2012/0134668 A1 | 5/2012 | Freiberger |
| 2012/0257641 A1 | 10/2012 | Hansson |
| 2013/0010600 A1 | 1/2013 | Jocha |
| 2013/0170388 A1 | 7/2013 | Ito |
| 2013/0322255 A1 | 12/2013 | Dillon |
| 2014/0043992 A1 | 2/2014 | Le Pallec |

OTHER PUBLICATIONS

Fasbender, A. et al. "On Assessing Unidirectional Latencies in Packet-Switched Networks." IEEE International Conference on Communications, vol. 1, Jun. 8, 1997, pp. 490-494 (5 pages).

International Telecommunication Union, ITU-T, G.8013/Y.1731, Series G: Transmission Systems and Media, Digital Systems and Networks, Jul. 2011 (92 pages).

International Telecommunication Union, ITU-T, Y.1564, Series Y: Global Information Infrastructure, Internet Protocol Aspects and Next-Generation Networks, Mar. 2011 (38 pages).

Mills, D. et al. "Network Time Protocol Version 4: Protocol and Algorithms Specification." Internet Engineering Task Force. Jun. 2010 (220 pages).

Pezaros, D. et al. "Low-Overhead End-to-End Performance Measurement for Next Generation Networks." IEEE Transactions on Network and Service Management. vol. 8, No. 1, Mar. 2011, pp. 1-14 (14 pages).

Sivrikaya, et al., "Time Synchronization in Sensor Networks: A Survey," Jul.-Aug. 2004, (10 pages).

International Search Report and Written Opinion dated Dec. 6, 2005, which issued in International Patent Application No. PCT/SE2005/001307 (9 pages).

European Search Report dated Sep. 27, 2013, which issued in European Patent Application No. 05779215.2 (6 pages).

International Search Report and Written Opinion dated Nov. 25, 2013, which issued in corresponding International Patent Application No. PCT/IB2013/001432 (10 pages).

Extended European Search Report dated Jul. 17, 2014, which issued in European Patent Application No. EP 06744558.5 (15 pages).

| Constants and Variables Names | Description | Example Value |
|---|---|---|
| SNR | Number of Synch Requests 202 sent | 3 Sync Request per SyncBurst |
| SyncBurst | Number of Synch Request bursts 300 | 8 SyncBurst per Sync Period |
| Interval between SyncBurst | The delay before starting another SyncBurst | Usually between 2 and 6 seconds in this embodiment |
| NSREQ | Current number of Synch Requests 202 sent | 0..3 |
| NSRSP | Current number of Synch Responses 203 received | 0..3 |
| T1 | Time 204 when message was sent by the measurement responding node 100 | |
| T2 | Time 205 when message was received by the measurement requesting node 102 | |
| T3 | Time 206 when reply was sent by the measurement requesting node 102 | |
| T4 | Time 207 when reply was received by the measurement responding node 100 | |
| RTT | Round-Trip Time 305 | |
| RTTMIN | Smallest RTT during a synchronization period 301 | |
| CABS | Wall clock value of the Measurement Responding Node 100. Set to the value of T4 207 timestamp by the measurement responding node 100 | |
| CDIFF | Difference (or Offset) 303 between the clock of the measurement responding node 100 and the clock of the measurement requesting node 102 | |
| SyncLine | The SyncLine or virtual clock 104 is defined as the combination of the following: Skew, CABS and CDIFF | A SyncLine requires a SyncWindow with at least 4 valid entries in this embodiment |
| SyncWindow | Table 302 of N entries holding Synchronization Points 301 | Usually 12 SyncPoints in a SyncLine as per this embodiment |
| SyncWindowSize | Number of valid Synchronization Points 301 in the Synch Window 302 | Maximum set to 12 in this embodiment |
| SyncPoint | A Synchronization Point 301 is defined by the following tuple: RTT, CABS, CDIFF and a VALID flag | A SyncPoint that does not have a VALID flag is ignored in the calculation of the Virtual Clock |

FIG. 5

Step 1: Calculate the mean of CABS and CDIFF for each valid SyncPoint
CABSmean = SUM (CABS for each SyncPoint) / number of SyncPoints
CDIFFmean = SUM (CDIFF for each SyncPoint) / number of SyncPoints — 800

Step 2: Calculate the sum of differences ABOVE and BELOW the slope of the SyncWindow for each valid SyncPoint
ABOVE += (CABS – CABSmean) * CDIFF
BELOW += (CABS – CABSmean) * (CABS – CABSmean) — 801

Step 3: Calculate a skew value by dividing the ABOVE value by the BELOW value
SKEW = ABOVE / BELOW — 802

Step 4: Calculate the new CDIFF for the Virtual Clock
CDIFF = CDIFFmean – (SKEW * CABSmean) — 803

Step 5: Set the new Absolute Clock reference point
CABS = CABSmean — 804

Step 6: Compute the Clock Difference from Time Zero to the current reference point
CDIFF += CABS * SKEW — 805

FIG. 8

SYSTEM FOR ESTABLISHING AND MAINTAINING A CLOCK REFERENCE INDICATING ONE-WAY LATENCY IN A DATA NETWORK

This application is a continuation of and claims priority to U.S. patent application Ser. No. 15/213,517, filed Jul. 19, 2016, now allowed, which is a continuation of U.S. patent application Ser. No. 14/817,398, filed Aug. 4, 2015, now U.S. Pat. No. 9,419,780, which is a continuation of U.S. patent application Ser. No. 14/305,244, filed Jun. 16, 2014, now U.S. Pat. No. 9,130,703, which is a continuation of U.S. patent application Ser. No. 13/593,888, filed Aug. 24, 2012, now U.S. Pat. No. 8,792,380, each of which is hereby incorporated by reference herein in its entirety.

FIELD OF THE INVENTION

A method for indicating one-way latency in a data network.

BACKGROUND OF THE INVENTION

Latency is a measure of time delay experienced in a system. Network latency in a packet-switched network is measured either one-way (the time from the source sending a packet to the destination receiving it), or two-way (the one-way latency from source to destination plus the one-way latency from the destination back to the source). Where precision is important, one-way latency for a link can be more strictly defined as the time from the start of packet transmission to the start of packet reception.

There are many possible techniques to synchronize time between a source and a destination. It is possible to achieve time synchronization by using synchronized clocks that use Global Positioning System (GPS) technology. GPS considers a satellite environment as reference time for the synchronization of the source and the destination. The synchronization accuracy depends on the precision with which the source and destination hosts are able to synchronize their internal clock to the GPS signal. Using GPS for synchronizing has several drawbacks:

the synchronization of several devices, each of which is equipped with a GPS receiver, can be expensive the GPS antenna has to be located within a specific distance from the receiver, limiting the positioning of monitoring devices Another synchronization system that can be used is Network Time Protocol (NTP) servers. The synchronization is obtained through the time reference offered by public NTP servers located across the Internet. This is the cheapest synchronization technique, but it does not provide as accurate results as GPS does; the accuracy depends on the characteristics of the paths followed by the NTP synchronization messages and on the distance between the NTP server and the source and destination that must be synchronized.

U.S. Pat. No. 7,283,568, with the title "Methods, systems and computer program products for synchronizing clocks of nodes on a computer network", discloses an algorithm for clock synchronization between two nodes using virtual clocks, a generalization of the clock synchronization for many nodes, and using many round-trip-delays to compute an average one-trip delay. A key feature of the embodiment described is that each node manages a virtual clock relying on average measurements for every other node it synchronizes with.

SUMMARY OF THE INVENTION

In accordance with one embodiment, a method is provided for indicating one-way latency in a data network, with continuous clock synchronization, between first and second node having clocks that are not synchronized with each other. The method executes a continuous synchronisation session by repetitively sending predetermined synchronization messages from the first node to the second node and from the second node to the first node, calculating a round trip time for each message at the first node, updating a synchronization point if the calculated round trip time is smaller than a previously calculated round trip time, storing the updated synchronization points of a synchronization window, and calculating a virtual clock from the updated synchronization points of the synchronization window. In addition, the method executes a measurement session to determine the one-way latency of the network between the first node and the second node by collecting multiple measurements of one-way latency between the first and second nodes using the virtual clock, and generating a latency profile by interpolating the multiple measurements. A plurality of the second nodes may be utilized.

In one implementation, a round trip time RT is calculated according to $RT=T4-T1-(T3-T2)$, where T1 is the sending time from the first node, T2 is the receiving time at the second node, T3 is the sending time at the second node, and T4 is the receiving time at the first node. The updating of a synchronization point may include comparing the calculated round trip time with the stored minimum round trip time for the current synchronization point and, if less, updating the stored minimum round trip time with the calculated round trip time for the current synchronization point, and calculating an offset CDIFF according to $CDIFF=(T2-T1+T3-T4)/2$, where T1 is the sending time at the first node, T2 is the receiving time at the second node, T3 is the sending time at the second node, and T4 is the receiving time at the first node, and setting the absolute clock (CABS) value for the current synchronization point to T4. The storing of a new synchronization point in a synchronization window may include storing the minimum round trip time value (RTT-MIN), storing the calculated offset (CDIFF), and storing the absolute clock value (CABS).

The calculating of a virtual clock may use the sum of least square method, comprising calculating the mean value for the absolute clock value (CABSmean) and the mean value for the offset (CDIFFmean) for each synchronization point in the synchronization window, calculating the sum of differences above the slope of the synchronization window for each synchronization point (ABOVE) as the sum of (CABS−CABSmean)×CDIFF, calculating the sum of differences below the slope of the synchronization window for each synchronization point (BELOW) as the sum of (CABS−CABSmean)×(CABS−CABSmean), calculating a skew value (SKEW) as the sum (ABOVE) divided by the sum (BELOW), calculating a new offset CDIFF as CDIFFmean−(SKEW×CABSmean), setting the new absolute clock value CABS for the virtual clock to CABSmean, and computing the clock difference CDIFF from Time Zero to the current reference point by adding the product of the absolute clock value and the skew to the previously calculated value of the offset CDIFF.

In one embodiment, for each of a plurality of messages received at the second node, the method sends the predetermined synchronization message N times from the first node to the second node chronologically equidistantly, receives the predetermined synchronization message at the second node, stores the sending time value for the first node, stores the receiving time value for the second node, and stores a validity indicator for each valid message. This method may include measuring the overhead for making measurements at the first and/or the second node.

The interpolating may comprise calculating the one-way latency in the data network between a first node and a second node according to: T2−T1+CDIFF. In one implementation, the interpolating comprises calculating the one-way latency in the data network between a first node and a second node, for each of a plurality of messages received at the second node, by calculating the one-way latency in the data network between a first node and a second node according to: T2−T1+CDIFF.

The above embodiments present a number of advantages, including increased accuracy of the measurements, and enabling one-way real-time latency measurements to be made with a high precision between nodes connected by a message-based network where clock synchronization of GPS precision is otherwise not available. These embodiments also provide individual per-packet latency values and perform high precision latency measurements of packets travelling between two nodes over a period of time. Since latencies may be asymmetric, round-trip estimation may not be used. Latency measurements must rely on absolute and synchronous time. The above embodiments preserve the accuracy of the virtual clock synchronization between source and destination for each measurement session to avoid the need for a lengthier synchronization phase before each measurement session.

BRIEF DESCRIPTION OF THE DRAWINGS

The invention may best be understood by reference to the following description taken in conjunction with the accompanying drawings.

FIG. 5 shows possible programmable data structures for the system.

FIG. 8 depicts the calculation of a new virtual clock.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

A method for indicating one-way latency in a data network, with continuous clock synchronization between a first node and a second node is disclosed. The method comprises the exchange of clock synchronization information between a pair of network nodes via a synchronization session. This synchronization session sends synchronization messages at regular intervals and is separate from other management, measurement or user traffic. Synchronization messages do not need to use the same path as other traffic between the pair of nodes. The network node is equipped with a network interface card that can communicate using the Internet Protocol (IP). Such a node has a CPU, memory buses, disks, etc, that enable it to operate as a computer. The node runs an operating system, in which the system software can be implemented. This embodiment is implemented as a software module running in an operating system of such a node.

Figure 1:
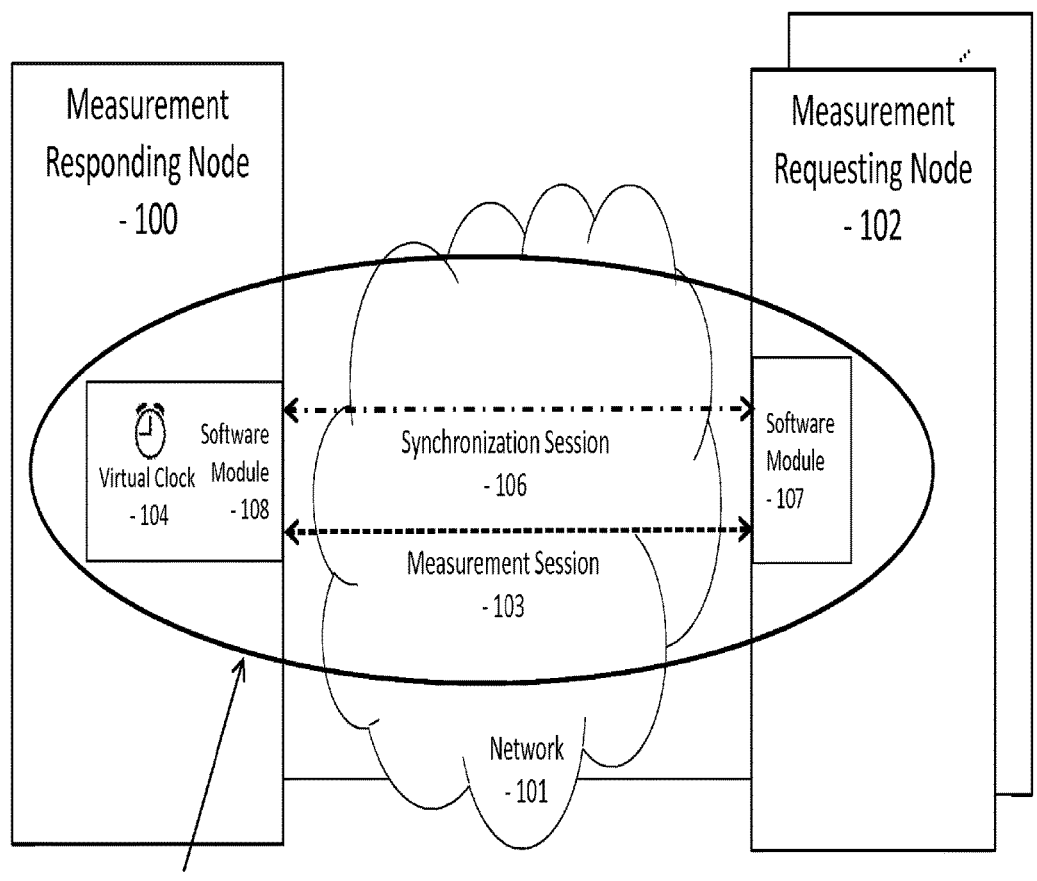
FIG. 1 depicts two nodes interconnected by a network and the various components and sessions involved.

FIG. 1 depicts a system with a measurement requesting node 102 and a measurement responding node 100, interconnected by a communication network 101. The nodes 100, 102 communicate by sending messages (packets) over the network 101. A software module 107 is used to implement the embodiment in the measurement requesting node 102, and another software module 108 is used to implement the embodiment in the measurement responding node 100. A measurement is performed from a measurement requesting node 102 to a measurement responding node 100. A measurement requesting node 102 can also perform measurements with more than one other node at the same time. The network 101 may be LAN (Local Area Network) or WAN (Wide Area Network) running the IP protocol. This enables any nodes 100, 102 with an IP-interface and an IP protocol stack to communicate with each other over the network 101.

The nodes 100, 102 communicate with messages over the network 101. There are two kinds of messages:
Synchronization messages
Measurement messages Both types of messages may be encapsulated over the IP protocol using the UDP/IP transport protocol or another datagram service. In an embodiment, both types of messages are encoded with the RTP protocol.

Measurement sessions 103 use a synchronized virtual clock 104 by measurement responding node 100 to time-stamp the measurement packets received from measurement requesting node 102. The virtual clock 104 between the two nodes needs to be established and maintained by the measurement responding node 100 of a measurement session. A measurement responding node 100 will maintain a separate virtual clock for each measurement requesting node 102.

A synchronization session 106 comprises sending a number of times a predetermined message sequence from the measurement responding node 100 to the measurement requesting node 102 which then sends a response message back to the measurement responding node 100.

Figure 2:
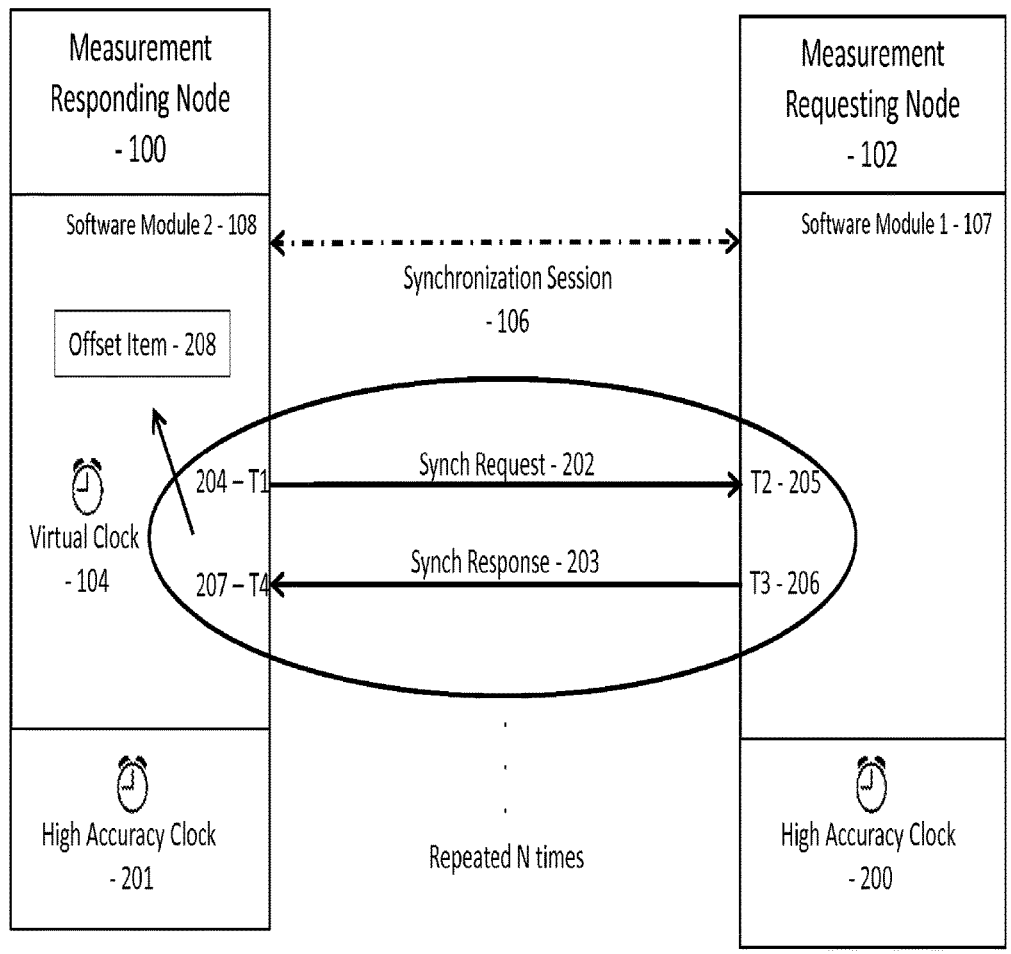
FIG. 2 depicts more details for a synchronization session between two nodes.

FIG. 2 is a more detailed description of the synchronization session 106. Both nodes 100, 102 have high accuracy clocks 201, 200 that are not synchronized with each other. High accuracy means that they are linear with respect to each other over a limited time period on the order of minutes, and that they have high resolution, at least to the level of 1 microsecond. That is, the clocks have different rates, but the rate difference is constant over time.

A synchronization message is either a synch request 202 or synch response 203. The synch request 202 is sent by the measurement responding node 100 and received by a measurement requesting node 102. A synch response 203 is sent by a measurement requesting node 102 in response to a synch request 202. The synch response 203 is received by the measurement responding node 100.

The synch request 202 message contains the following fields: a sequence number and a time-stamp T1 204.

The synch response 203 contains the following fields: a sequence number and three timestamps: T1 204, T2 205, and T3 206. The semantics of the message fields are as follows:

Sequence number—The measurement responding node 100 sets the sequence number incrementally (for example: 0, 1, 2, etc). The measurement requesting node 102 copies the sequence number from a synch request 202 to the synch response 203. The sequence number is used by the nodes 100, 102 to detect packet loss, reordering or duplication on the network.

Timestamp T1 204. The time when the synch request 202 was sent by the measurement responding node 100.

Timestamp T2 205. The time when the synch request 202 was received by the measurement requesting node 102.

Timestamp T3 206. The time the synch response 203 was sent by the measurement requesting node 102.

The next step is for the measurement responding node 100 to calculate an offset item 208 according to ((T2−T1)+(T3−T4))/2, where T1 204 is the sending time of the synch request 202 from the measurement responding node 100, T2 205 is the receiving time of the synch request 202 at the measurement requesting node 102, T3 206 is the sending time of the synch response 203 at the measurement requesting node 102, and T4 207 is the receiving time of the synch response 203 at the measurement responding node 100. The time T4 207 is set to the current time of the high accuracy clock 200.

Figure 3:
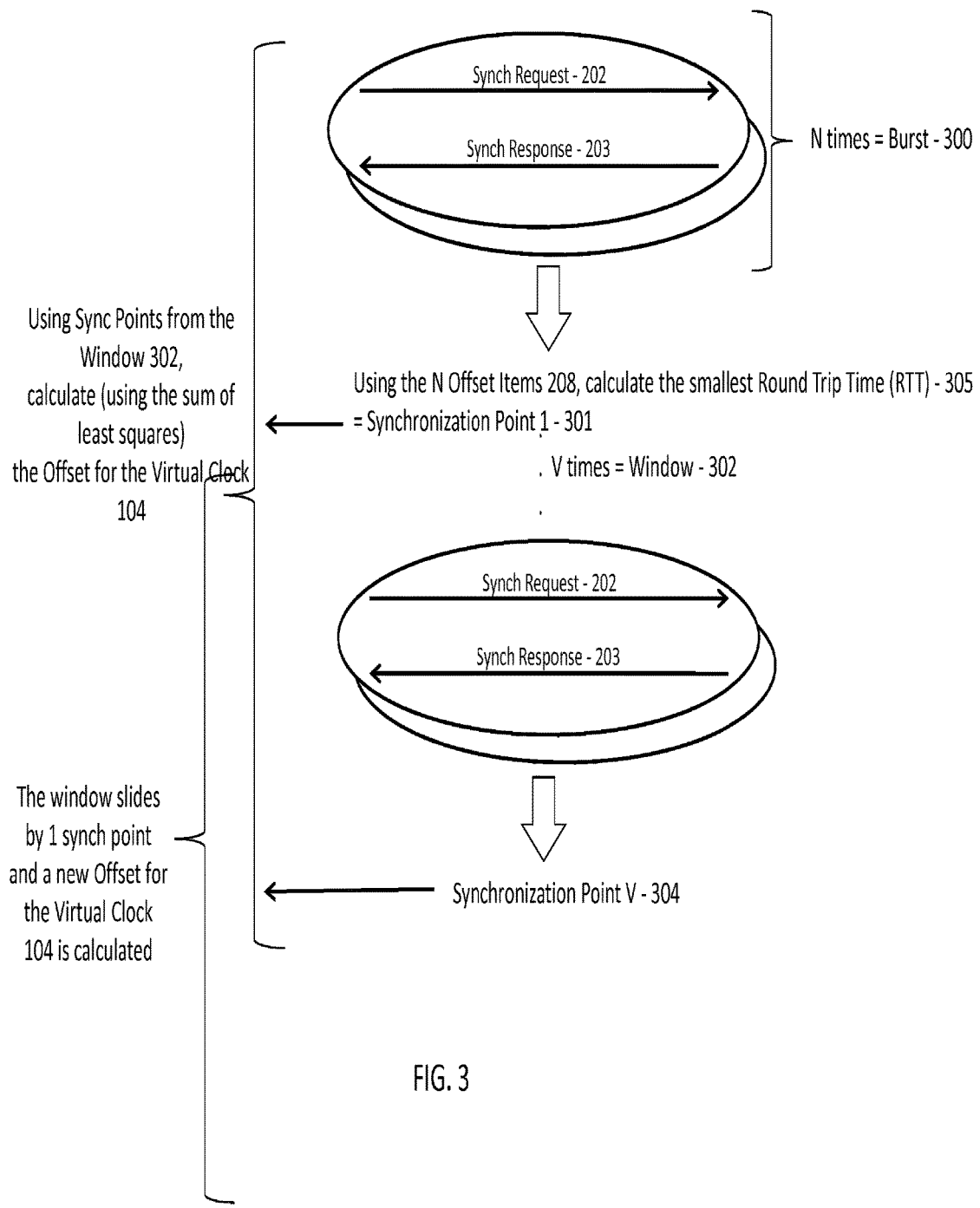
FIG. 3 shows the makeup of synchronization bursts and synchronization windows.

FIG. 3 details how the offset for virtual clock 104 is set. The synchronization session 106 comprises sending at regular intervals the synch request 202 and synch response 203 in bursts of N messages 300. However, there may be cases where not all of the N messages in a burst 300 are received. In such cases, there will be gaps in the correspondence of the data sent and received. This may be handled by not using the measured values associated to the missing messages. Then N or a number less than N, round-trip-time times 305 are generated. This is done according to $T_i4 − T_i1 − (T_i3 − T_i2)$, where i is in the interval [1 . . . N]. N offset items 208, or a number of offset items 208 less than N, as described above are generated. The offset item 208 with the minimum round-trip-time 305 is retrieved and is used as the next synchronization point 301 in the synchronization window 302.

Once the synchronization window 302 includes a minimum number of synchronization points 301, 304 (experimentation indicates that 4 entries are a good minimum number of entries), the offset for the virtual clock 104 for the measurement responding node 100 can be calculated using the least square method applied to the most recent V synchronization points 301, 304 (where V is typically set to a value between 4 and 12) in the synchronization window 302. Using the least square method yields better results than simply computing an average value. Once an initial value for the offset for the virtual clock 104 of the measurement responding node 100 is calculated, the synchronization session 106 remains active to obtain other values for the offset for the virtual clock 104 and refreshing the offset for the virtual clock 104 using the V most recent values (or less than V if not enough synchronization points 301, 304 have been established to date) to recalculate the offset for the virtual clock 104 using the least square method.

Measurement messages are sent from the measurement requesting node 102 to the measurement responding node 100. The measurement messages contain a sequence field and a timestamp field T1.

The semantic of the message fields are as follows:

Sequence number. The measurement requesting node 102 sets the sequence number incrementally (for example: 0, 1, 2, etc).

Timestamp T1. The time (from the high accuracy clock 200) when the measurement message was sent by the measurement requesting node 102.

The measurement step comprises calculating the one-way latency in the network 101 between a measurement requesting node 102 and a measurement responding node 100 according to the following relations:

latency=the time at which the measurement responding node 100 received the measurement message−(T1+(the offset for the virtual clock 104 calculated for the measurement responding node 100×calculated skew)).

An overhead amount corresponding to the overhead for making measurements at one of the nodes 100, 102 can be subtracted from the above amount.

It is possible to operate in relation to more nodes than a single one. The present embodiment may be used to operate against a plurality of nodes by maintaining a synchronization window 302 and an associated virtual clock 104 at a measurement responding node 100 for each measurement requesting node 102 via synchronization sessions 106 with each of a plurality of measurement requesting nodes 102.

Figure 4:
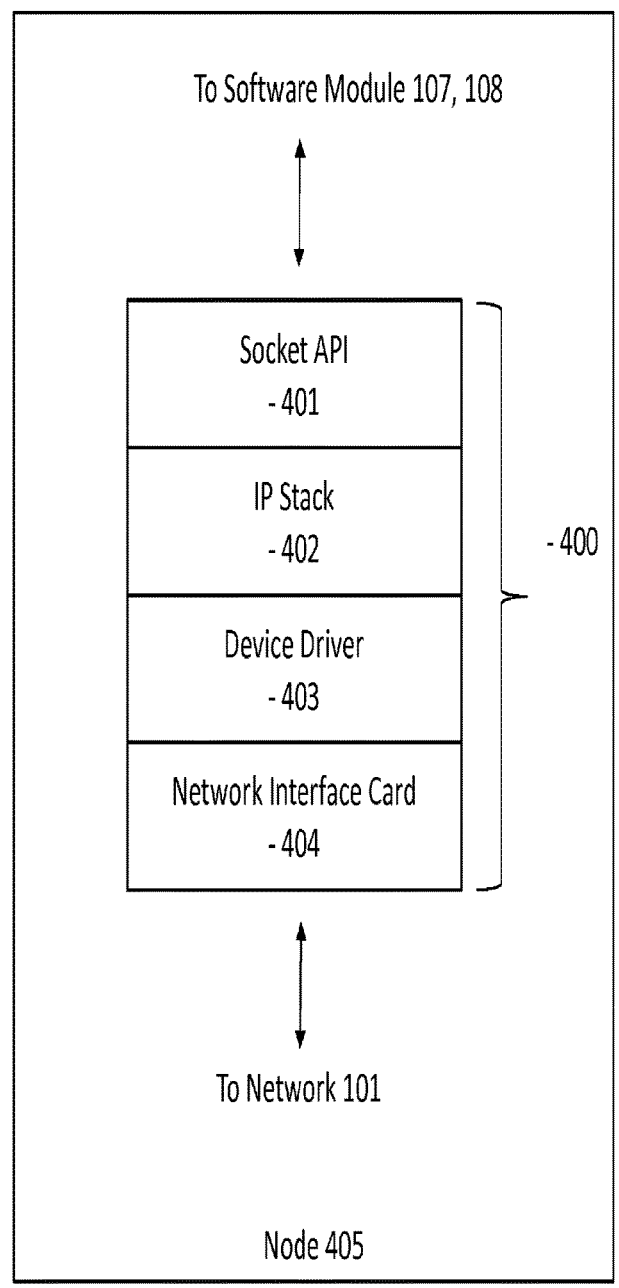
FIG. 4 a network module is schematically depicted.

In FIG. 4, an incarnation of a network module 400 is shown. The software modules 107, 108 implementing the embodiment need to have access to a network module 400. The network module 400 typically consists of a network interface card 404, a device driver 403, an IP stack 402 and a socket API 401. The network interface card 404 enables the node 405 to physically connect to an access network. The device driver 403 contains software enabling the IP stack 402 to access the network services on the network interface card 404. The IP stack 402 contains a full implementation of the communication protocols that enables the node 405 to communicate over the internet. This may be the set of protocols referred to as TCP/IP. The socket API 401 is a functional interface that the software module can access in order to send and receive packets to and from the network.

The software module implementing the embodiment may be implemented as a user application in an operating system. It requires a socket API to access the network in order to send and receive packets over the network. In another embodiment, the software module may be implemented as a kernel application.

The method is divided into two steps:

On-going Clock Synchronization

Measurement: requires that clock synchronization has been achieved between the measurement responding node 100 and the measurement requesting node 102.

FIG. 5 is a table of constants used to parameterise the software modules 107, 108. The values given to the constants are merely an example.

Figure 6:
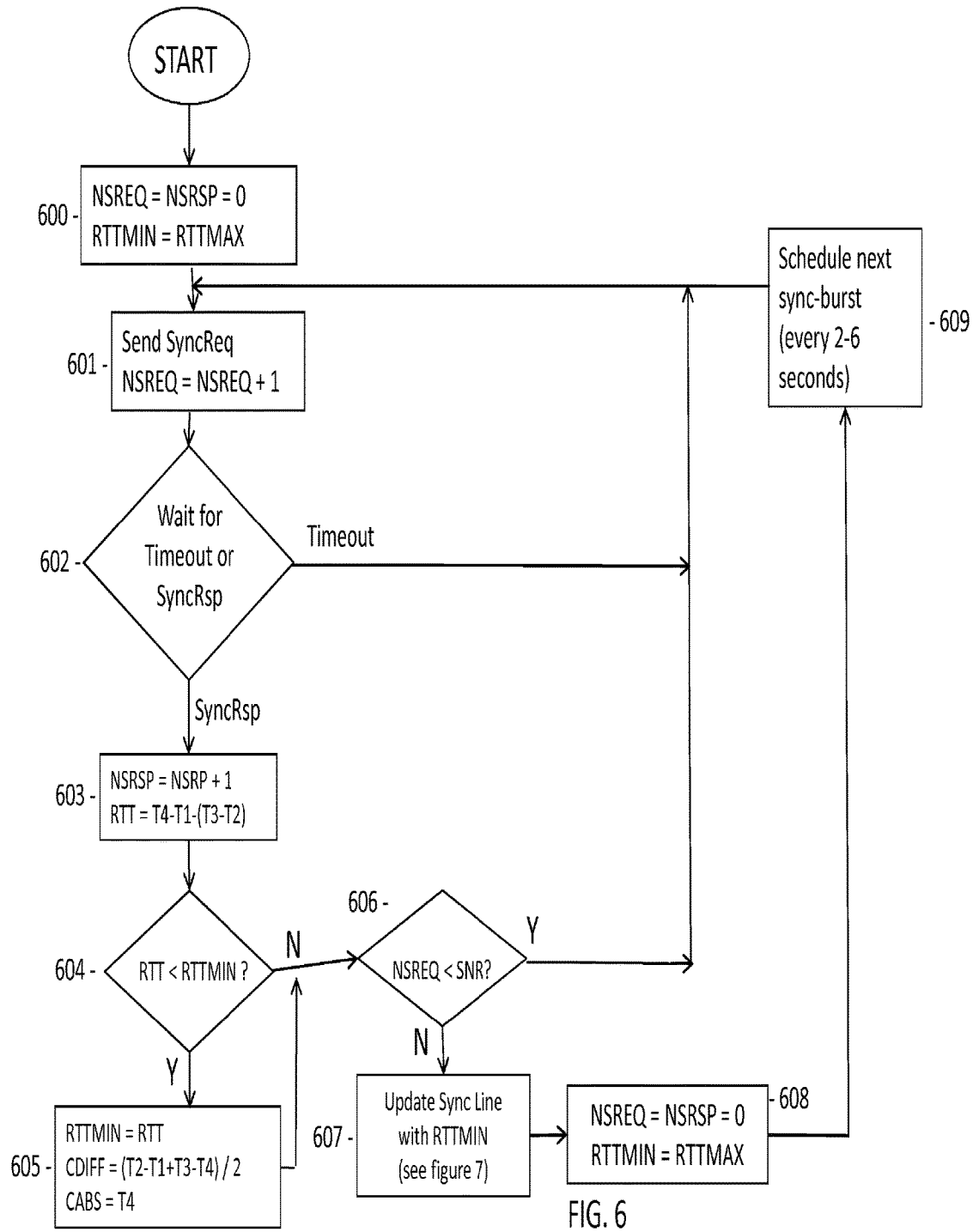
FIG. 6 is a synchronization session flowchart for the measurement responding node in a 1-way measurement session.

In FIG. 6, an on-going synchronization session 106 is schematically depicted. A synchronization session is established between each pair of nodes 100, 102. The synchronization session 106 is used to initially build a synchronization window 302 of at least 4 entries and up to 12 entries in order to hold synchronization points 301 to be used in the calculation of the synchronization line representing the virtual clock 104. At regular intervals, a burst 300 of synchronization requests are sent from the measurement responding node 100 that needs to setup a virtual clock 104 since it will handle measurement requests in measurement sessions 103 (once a virtual clock 104 is synchronized on the measurement responding node 100) for a measurement requesting node 102 (this is the node that will initiate a measurement session).

Each burst 300 of synch requests 202 (SyncReq) starts by resetting the number of synch request and number of synch response (NSREQ and NSRSP) counters to a default value of zero (0) and setting the round trip time minimum (RTT-MIN) value to a high value 600. For the duration of a synchronization burst 300, the sending node will send SyncReq messages 601 and will wait for a SyncRSP reply 602. Each SyncReq message includes a T1 timestamp 204 and the SyncRsp repeats the original T1 timestamp and adds the T2 205 and T3 206 timestamps. The T4 timestamp 207 is set internally for each SyncRsp received back at the sending node.

If a timeout is received, processing goes to 601 (see ahead).

Whenever a valid SyncRsp is received 603, the Round-Trip-Time (RTT) 305 is calculated by subtracting T1 204 from T4 207 and further subtracting the delay to prepare the SyncRsp reply represented by the difference between T3 206 and T2 205. This yields the current RTT 305 value 604.

If this RTT 305 value is smaller than the current RTTMIN value 605, the RTTMIN candidate value for the current synchronization point (SyncPoint) 301 is updated to reflect the current RTT 305.

The Clock Difference (CDIFF) for the candidate SyncPoint 301 is calculated as the sum of the delay in each direction divided by 2. This is represented by the formula: CDIFF=(T2−T1+T3−T4)/2. The absolute value of the virtual clock 104 (CABS) for the candidate SyncPoint 301 is set to the time when the current SyncRsp 203 was received (T4 207). This is represented by the formula CABS=T4.

If the RTT value 305 is not smaller than the current RTTMIN. Processing goes to 606 (see ahead).

The number of sent synchronization requests NSREQ in the current burst 300 is then checked 606. If the value of NSREQ has not yet reached the maximum defined for the SyncBurst, another SyncReq is sent 601.

Otherwise, the desired number of SyncRsp messages has been received 607 and the Virtual Clock 104 can be updated taking into account the most recent SyncPoint 301. The update of the Virtual Clock 104 is discussed in more details below as per FIG. 7.

Once a SyncPoint 301 is established, the NSREQ and NSRSP counters and RTTMIN are reset in order to allow for another SyncBurst to take place 608.

The SyncBurst will be delayed for a longer period (in the order of 6 seconds in this embodiment) once a valid Virtual Clock 104 has been established. Otherwise, a more aggressive SyncBurst period (set to 2 seconds in this embodiment) will be used 609.

Figure 7:
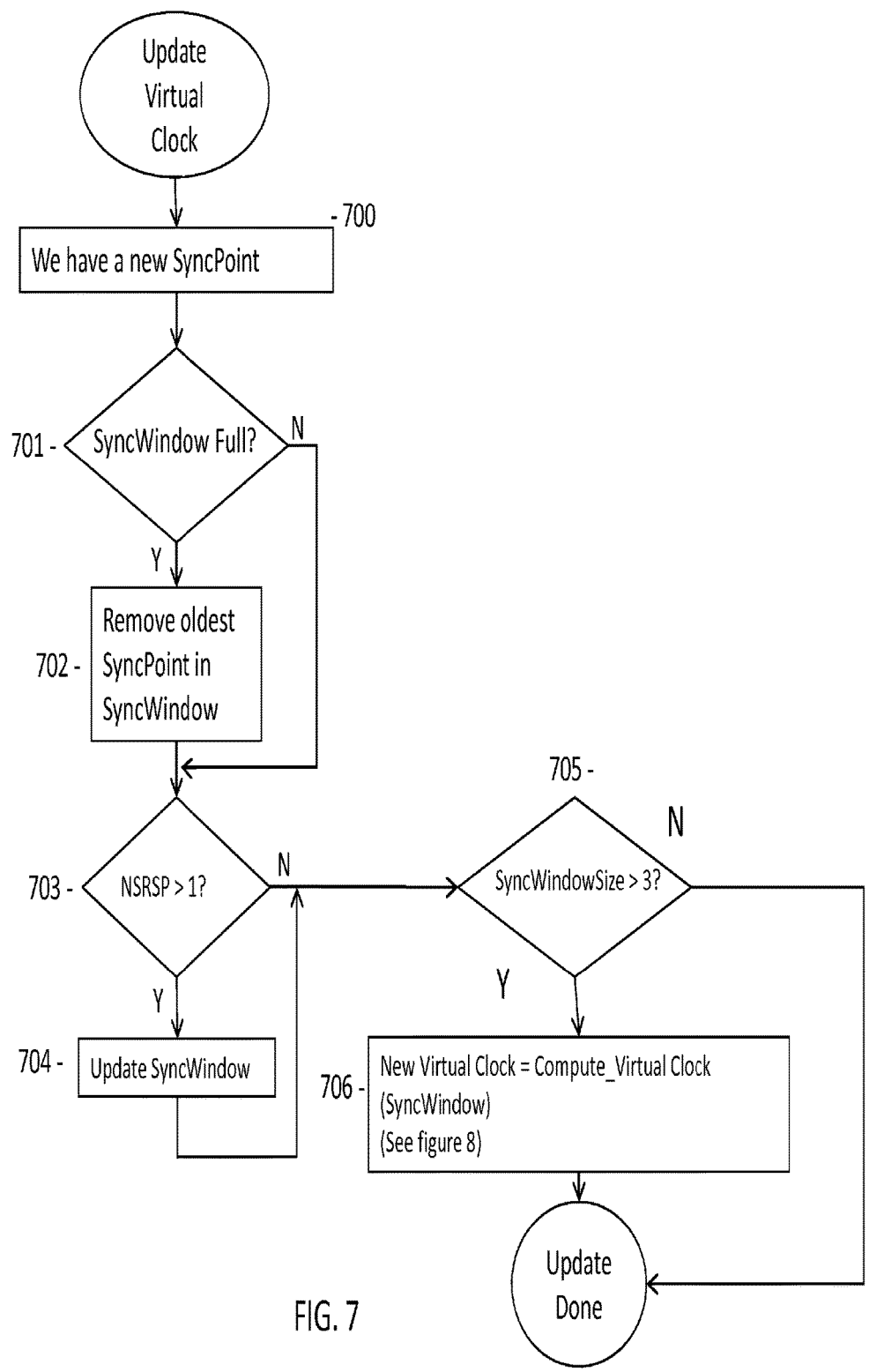
FIG. 7 shows the handling of a new Synchronization Point for a new synchronization window.

As per FIG. 7, the update of the Virtual Clock 104 takes place when a new SyncPoint has been obtained 700.

The size of the SyncWindow is checked 701. If it is not full processing goes to 703 (see ahead).

Otherwise the maximum size of the SyncWindow has been reached 702 and, the oldest SyncPoint shall be removed from the SyncWindow and no longer used when calculating the Virtual Clock 104.

The number of SyncRsp NSRP is checked 703. If none have been received, the new SyncPoint is not valid and the processing goes to 705 (see ahead).

A SyncPoint will be declared valid as long as at least one (1) SyncRsp has been received 703 and the syncWindow is updated 704.

The number of SyncPoints in the SyncWindow SyncWindowSize is checked 705. If it is not at least 4 then the process reverts back to the steps in FIG. 6 with a new SyncBurst.

Once the SyncWindow includes at least four (4) SyncPoint, the Virtual Clock 104 representing the Virtual Clock can be computed 706. This is covered in more details in FIG. 8. Once the updating of the Virtual Clock 104 is completed, the process reverts back to the steps in FIG. 6 with a new SyncBurst.

As per FIG. 8, the calculation of the Virtual Clock 104 tuple relies on the Sum of Least Square Method to smooth out the variations in the SyncPoint value in the SyncWindow. The virtual clock 104 for a specific measurement requesting node 102 is defined by the following tuple:

SKEW: this is the variation (sometimes referred to as the jitter) of the clock between the measurement responding node 100 and the measurement requesting node 102

CABS: this is the absolute value or wall clock value of the measurement requesting node 102

CDIFF: difference (or offset) between the clock of the measurement responding node 100 and the clock of the measurement requesting node 102.

The calculation of the virtual clock 104 involves the steps defined in FIG. 8 and are discussed in further details below:

Step 1 800: in order to obtain the Sum of the Least Square value for the virtual clock 104, a mean CABS value is obtained using each valid SyncPoint in the SyncWindow and a mean CDIFF value is obtained using each valid SyncPoint in the SyncWindow as follows:

$$CABSmean=SUM(CABS\ for\ each\ valid\ SyncPoint)/Number\ of\ valid\ SyncPoint$$

$$CDIFFmean=SUM(CDIFF\ for\ each\ valid\ SyncPoint)/Number\ of\ valid\ SyncPoint$$

Step 2 801: Calculate the sum of differences above and below the slope of the SyncWindow as follows:

For each valid SyncPoint in the SyncWindow, $$ABOVE=SUM((CABS-CABSmean) \times CDIFF)$$

$$BELOW=SUM((CABS-CABSmean) \times (CABS-CABSmean))$$

Using the mean value for CABS and CDIFF and the ABOVE and BELOW values, it is now possible to update the tuples making up the Virtual Clock 104 per these remaining steps.

Step 3 802: the updated SKEW is obtained by dividing the value of ABOVE by the value of BELOW:

$$SKEW=ABOVE/BELOW$$

Step 4 803: the new difference between the clocks of the measurement responding node 100 and of the measurement requesting node 102 involved in this Synchronization Session is obtained by subtracting the mean value of the CABS multiplied by the SKEW from the mean CDIFF value calculated in step 1.

$$CDIFF=CDIFFmean-(SKEW*CABSmean)$$

Step 5 804: the new wall clock value of the measurement requesting node 102 is set to the mean value of the wall clock value of each valid SyncPoint in the SyncWindow calculated in step 1 above:

$$CABS=CABSmean$$

Finally, in step 6 805, the clock difference from the initial reference point for the Synchronization Session (also called time zero) is obtained by adding the product of the new CABS value multiplied by the SKEW to the value of CDIFF obtained in Step 4 803 above.

In summary, the process illustrated by FIG. 8 updates the virtual clock 104 tuple made up of the CABS, CDIFF and SKEW value obtained from the valid SyncPoints in the current SyncWindow.

Figure 9:
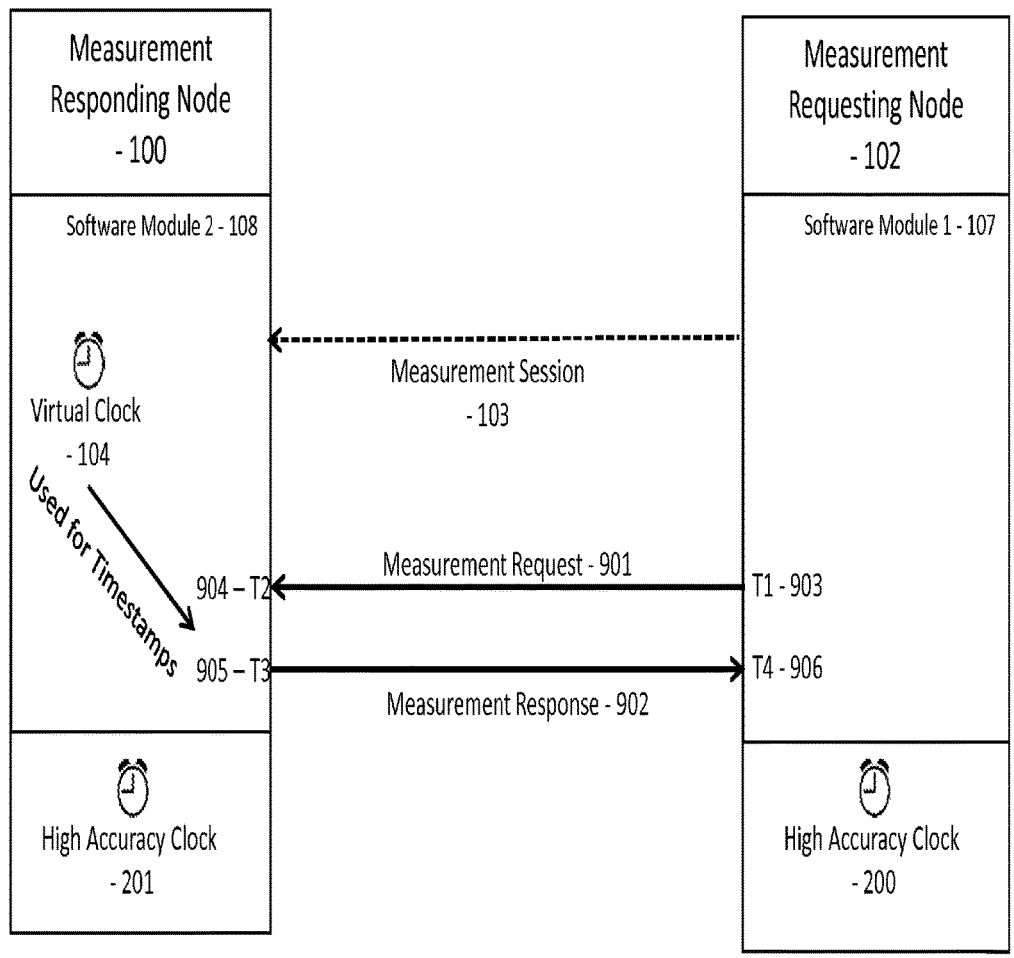
FIG. 9 depicts more details for a measurement session between two nodes.

FIG. 9 depicts a measurement session 103. A measurement session 103 consists of the measurement requesting node 102 periodically sending measurement request messages 901 to the measurement responding node 100. T1 902 is the timestamp when the message leaves the measurement requesting node 102. T2 904 is the timestamp for when the measurement request 901 message is received by the measurement responding node 100. In the case of a two-way measurement request, a measurement response 902 is needed. If so, T3 is the timestamp for when the measurement response 902 message leaves the measurement responding node 100. The virtual clock 104 is used in these timestamps to synchronize the times between the two nodes. T4 is the timestamp for the measurement requesting node 102 receiving the measurement response 902.

Figure 10:
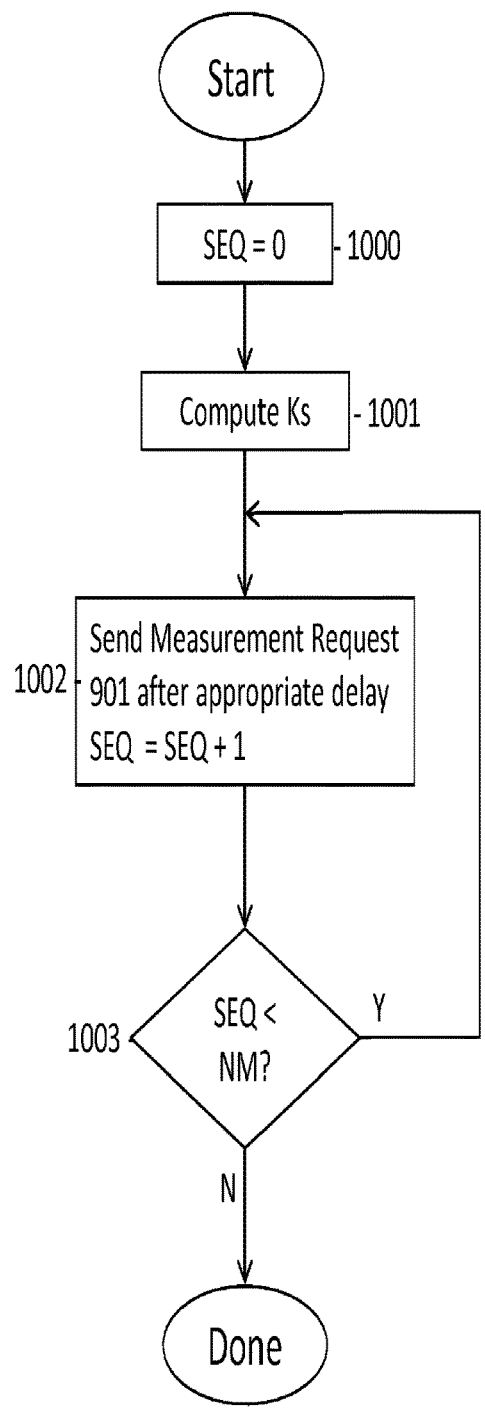
FIG. 10 is a flowchart of the measurement requesting node in the measurement phase.

FIG. 10 is a flowchart of a measurement session 103. The measurement responding node 100 records the timestamps T1 903 of the time of sending stored in a measurement request 901 message in the vector A[ ] and the timestamp T2 904 of receiving of the measurement request 901 in vector B[ ]. The size of the vectors is equal to the number of measurement messages 901 sent, NM. The two vectors A[ ] and B[ ] are later used in the interpolation phase.

The measurement requesting node 102 sends NM messages (for example 10000) with interval DT between each packet (for example 20 ms). Each measurement request 901 message will contain SEQ (the sequence number) initially set to 0 1000 and the time T1 903 the measurement request 901 was sent as per the measurement requesting node 102 high accuracy clock 200. The overhead of sending a measurement request 901 Ks is computed initially 1001. This is the difference in time from when the timestamp T1 903 was taken and when the measurement request 901 was actually sent. Ks may be set to 0 if the measurement requesting node 102 lacks the capability to compute this time. The next measurement request 901 is sent after the appropriate period of time and the sequence number SEQ is incremented 1002. The measurement requesting node 102 then checks to see if the sequence number SEQ is less than the number of measurement request 901 NM to be sent 1003. If it is, then it goes back around to 1002. Once the sequence number SEQ and number of messages to be sent NM are the same, all of the measurement requests 901 for a measurement session 103 have been sent and the processing on the measurement requesting node 102 is complete.

Figure 11:
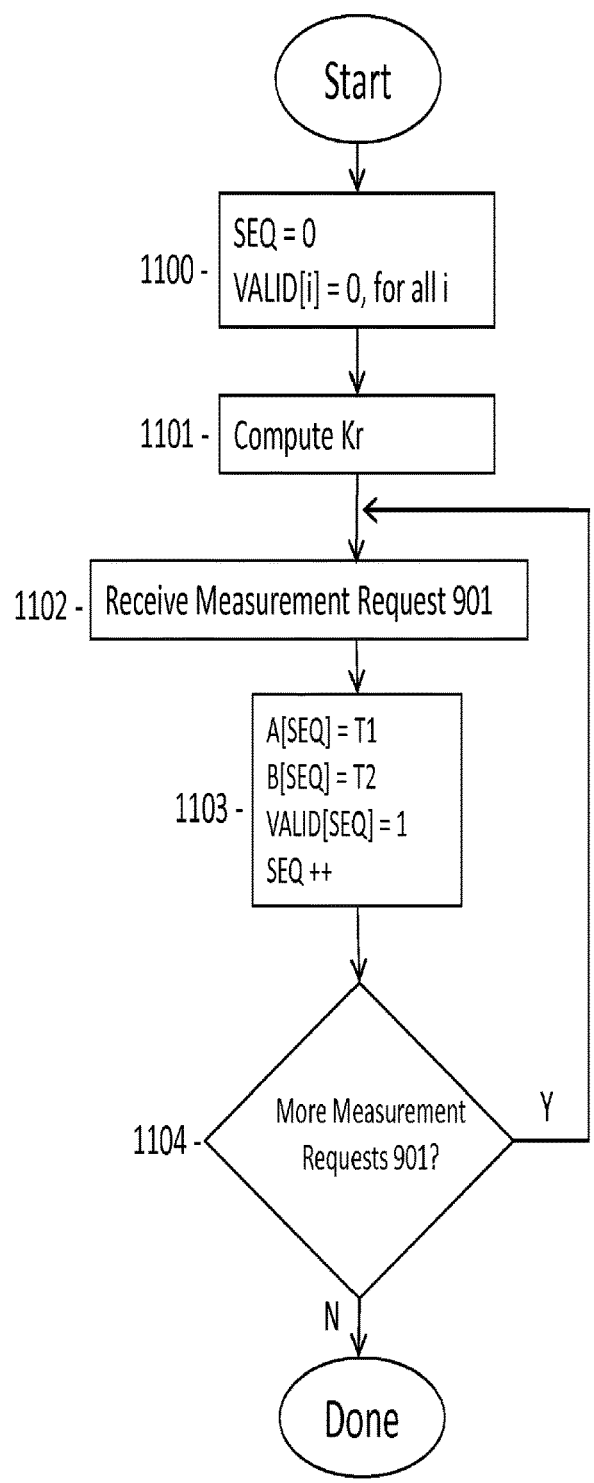
FIG. 11 is of a flowchart of the measurement responding node in the measurement phase.

FIG. 11 shows a flowchart of the handling of a measurement session by the measurement responding node 100. The measurement responding node 100 stores the sending timestamp T1 903 in a vector A for each measurement request 901 it receives, and the receiving timestamp T2 904 in a vector B. A flag in the vector VALID is set to indicate that the collected metrics (T1 903 and T2 904) collected for this measurement request can be used to calculate the latency profile of this measurement session 103. The sequence number SEQ is used as an index in the vectors A, B and VALID and is initially set to 0 1100. Kr, the overhead of receiving a measurement request 901 is computed initially 1101. This is the difference in time from when the T2 timestamp 904 was taken and when the measurement request 901 was actually received. Kr may be set to 0 if the measurement responding node 100 lacks the capability to compute this time. The measurement responding node 100 waits 1102 for the next measurement request 901. After receiving 1103 a measurement request 901, the value of the sending timestamp T1 903 is extracted from the measurement request 901 and stored in vector A and the timestamp T2 904 for the received measurement request 901 is stored in vector B. The corresponding VALID flag is set to indicate that the measurement request is valid and the SEQ value is incremented. At 1104, a check is made to determine if there are more measurement requests to be received. If this is the case, the processing resumes at 1102, otherwise the last measurement request 901 in the measurement session 103 has been received and the latency profile can now be measured during the interpolation phase.

Figure 12:
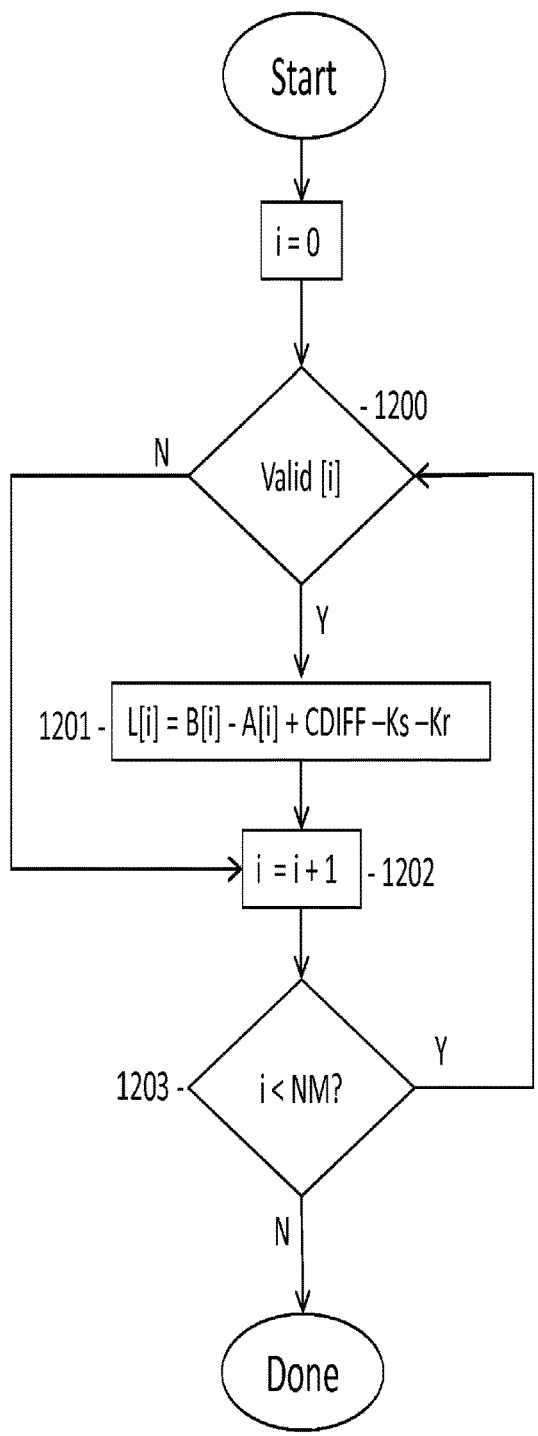
FIG. 12 is a flowchart of the measurement responding node in the interpolation phase.

FIG. 12 is a flowchart describing the interpolation phase. The measurements collected during the measurement phase 1102 in the vectors A [ ] and B [ ] along with the value of CABS and CDIFF for the current virtual clock 104 are used to interpolate a sequence of one-way latency values 1103. The method itself can be performed on the measurement requesting node 102, the measurement responding node 100, or some other node, and can be performed at any time after a measurement session 103 is completed. For example, the interpolation phase can take place as a post processing stage in a server. However, the measurements collected during the measurement phase 1102 must be transferred to the device where the interpolation phase is implemented. The end result of the interpolation phase is a latency profile (vector L [ ]), with NM entries containing the precise one-way latency values of the measurements requests 901 between the measurement requesting node 102 and measurement responding node 100. A latency profile is calculated by analysing the measurement information collected during the measurement session 103. A loop is used to iterate through all of the collected measurements in vectors A and B. In 1200, the validity of the measurement metric is verified. If they are valid, then a latency profile is calculated and stored in vector L [ ] in 1201 as follows: L[i]=B[i]−A[i]+CDIFF−Ks−Kr and the index used to cycle through the collected measurements is incremented in 1202. In 1203, a check is made to determine if the entire set of collected measurements has been analysed or not. If there is more measurement to analyse, processing resumed at step 1200. Otherwise, the latency profile L [ ] is available.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A system for adapting to clock offsets between a responding node and one or more requesting nodes in a network, the system comprising:
   a requesting node;
   said responding node coupled to the requesting node over the network, the responding node maintaining a virtual clock associated with the requesting nodes, the responding node transmitting a plurality of synchronization requests to said requesting nodes;
   wherein, in response to each of the plurality of synchronization requests, the requesting nodes transmits one of a plurality of corresponding synchronization responses to the responding node; and wherein responding node further comprises a module for calculating a plurality of round trip delay measurements at the responding node based on the plurality of corresponding synchronization responses, in response to calculating the plurality of round trip delay measurements, the module producing a latency profile for the requesting nodes.

2. The system of claim 1 wherein the responding node further comprises a synchronization point associated with the requesting node, the synchronization point produced based on the plurality of round trip delay measurements.

3. The system of claim 2 wherein the synchronization point is periodically updated using an additional plurality of round trip delay measurements.

4. The system of claim 1 wherein the number of the plurality of synchronization requests is predetermined.

5. The system of claim 2 wherein the plurality of synchronization points are produced by calculating a sum of least-squared method.

* * * * *